United States Patent [19]

Smalligan et al.

[11] 4,013,799
[45] Mar. 22, 1977

[54] PREPARATION OF A STABILIZED PRECOOKED BABY FOOD FORMULATION THICKENED WITH MODIFIED TAPIOCA STARCH

[75] Inventors: Wayne J. Smalligan; Vincent J. Kelly; Estela G. Enad, all of Fremont, Mich.

[73] Assignee: Gerber Products Company, Fremont, Mich.

[22] Filed: May 30, 1972

[21] Appl. No.: 257,563

[52] U.S. Cl. .............................. 426/578; 426/401; 426/407; 426/801
[51] Int. Cl.² ..................................... A23L 1/10
[58] Field of Search ............. 99/154, 214, 215, 54, 99/63, 64, 93–94; 127/28, 32, 71; 426/549, 550, 578, 579, 619, 620, 628, 661, 399–401, 407, 408, 521, 800, 804

[56] References Cited
UNITED STATES PATENTS

| | | |
|---|---|---|
| 642,330 | 1/1900 | Higgins .................. 127/32 X |
| 1,069,096 | 8/1913 | Alberty .................. 99/54 |
| 1,175,114 | 3/1916 | Bauer .................... 127/71 X |
| 1,851,749 | 3/1932 | Bergquist ................ 127/71 X |
| 2,332,320 | 10/1943 | Kerr ..................... 127/71 |
| 2,673,803 | 3/1954 | Lockhart ................. 99/63 X |
| 2,734,826 | 2/1956 | Stentz et al. ............ 99/214 X |
| 3,123,502 | 3/1964 | Henry et al. ............. 127/71 |
| 3,374,115 | 3/1968 | Frank et al. ............. 127/32 X |

Primary Examiner—Norman Yudkoff
Assistant Examiner—Martin G. Mullen
Attorney, Agent, or Firm—Townsend and Townsend

[57] ABSTRACT

A method is disclosed herein where a wet, pre-cooked baby food formulation having a pH below about 4.5, is thickened by including a tapioca starch that has been modified by heating above the gelatinization temperature thereof, but with insufficient moisture to produce gelatinization. Further advantages are obtained by including minor amounts of other grain starches. The formulation exhibits excellent consistency during prolonged storage periods.

11 Claims, 3 Drawing Figures

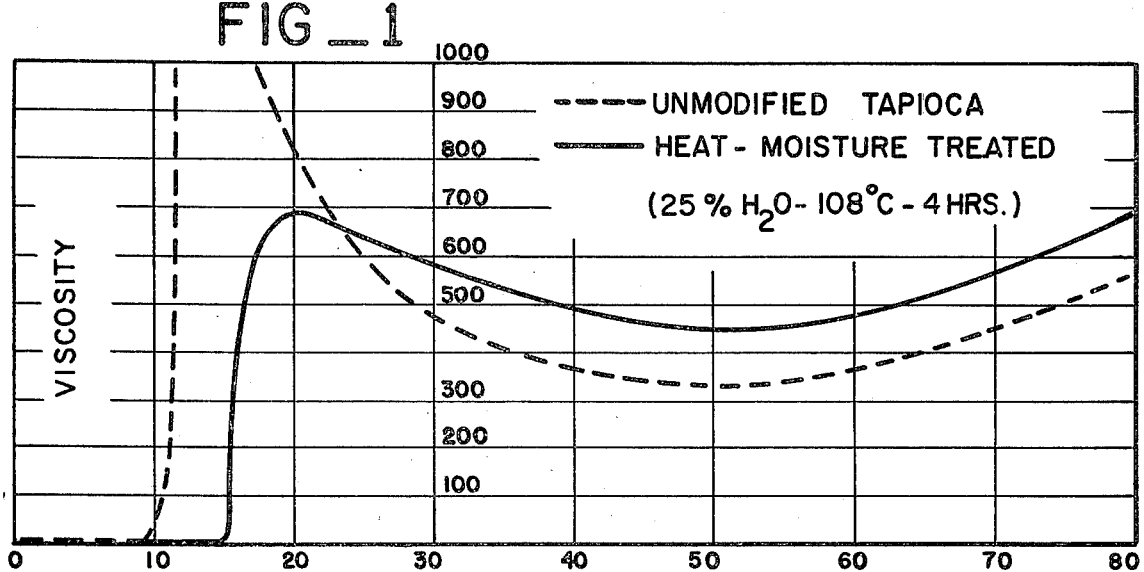
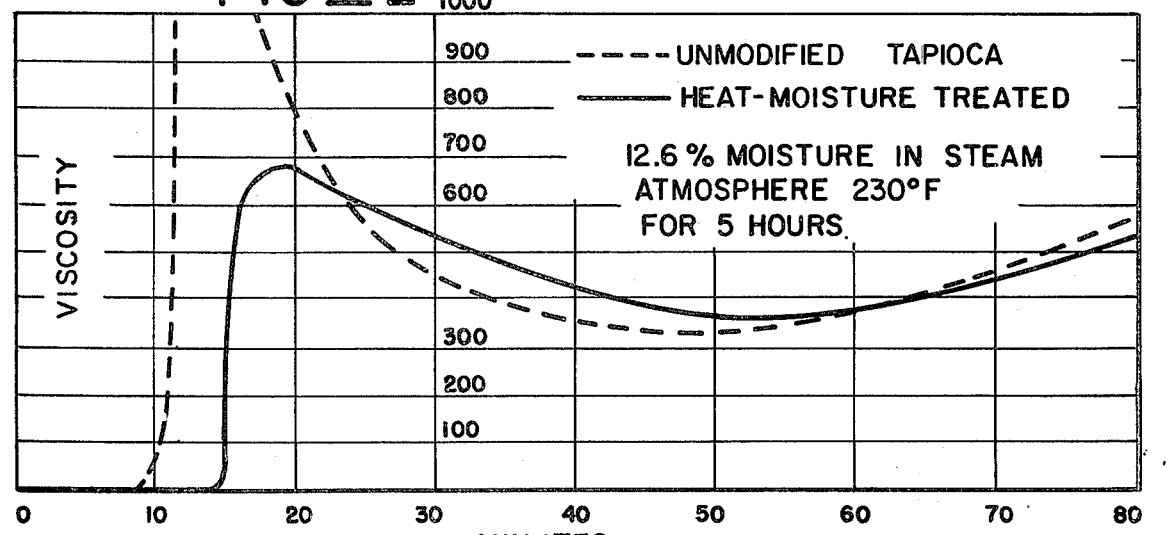
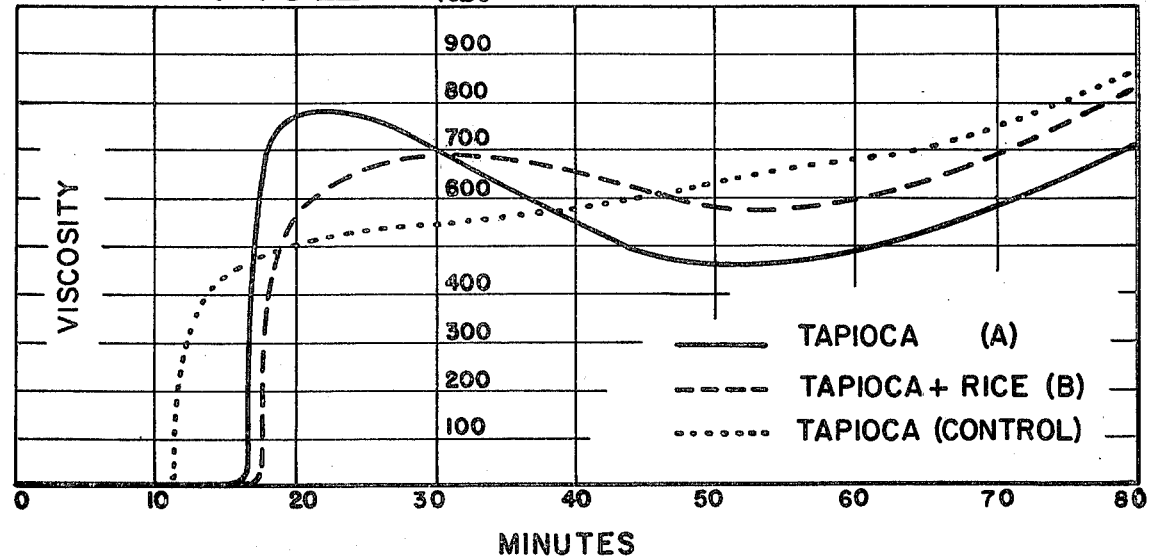

PREPARATION OF A STABILIZED PRECOOKED BABY FOOD FORMULATION THICKENED WITH MODIFIED TAPIOCA STARCH

This invention relates to starch-containing, pre-cooked wet food products having a long shelf life and, more particularly, to the preparation of thickened wet, pre-cooked baby food formulations having a pH of up to 4.5 that exhibit uniform dispersion characteristics during lengthy storage periods.

BACKGROUND OF THE INVENTION

In the preparation of nutritious wet baby food formulations, it is necessary to incorporate a thickening agent such as starch to obtain a product attractive to the consumer. Naturally occurring starches suffer from various shortcomings when employed in such formulations. For example, unmodified tapioca starch forms a very stringy, cohesive paste when gelatinized in water. Therefore, in conventional practice, various of the grain and root starches that have been chemically modified have been utilized in such products. Such chemical modification usually involves cross-linking with, for example, phosphorous oxychloride, epichlorohydrin, acrolein, divinyl-sulfone, di-epoxy reagents, aldehydes, glycidaldehyde, thermosetting resins or their monomers, etc.

While such chemical modifications change the paste character of starches, and give the starch paste a desirable texture, such cross-linking agents suffer from the disadvantage of being classified as toxic materials. Thus, when they are used in preparation of food starches, great care must be taken to insure that toxic residual reagents or side reaction products do not remain in the food starch. In addition, certain chemically modified starches have been criticized for their lack of digestibility in infant foods. Therefore, the attainment of similar starch attributes without relying upon chemical modification of starch would be especially advantageous.

SUMMARY OF THE INVENTION

It has now been found the ungelatinized tapioca starch that is subjected to heating under limited moisture conditions, as hereinafter described, exhibits excellent stability over prolonged periods when utilized in the preparation of ready-to-eat baby food formulations. In fact, when such physically modified tapioca starch is incorporated with conventional baby food formulations prior to cooking, the resulting pre-cooked product has been found to have rheological characteristics at least as beneficial as those present in a product prepared through the use of the more expensive chemically modified tapioca starch. Particular advantages are obtained when the baby food formulation is acidic, i.e., has a pH of less than about 4.5.

It has now been discovered that the physical properties of tapioca starch are enhanced without the use of chemical reagents by first adjusting the natural moisture content of the starch (from approximately 12.6% by total weight) into the range of 15 to 35% by total weight and thereafter heating to a temperature of 70°–130° C for 1 to 72 hours. The resulting physically modified tapioca starch has been found to exhibit the characteristics heretofore obtained only through chemical modification. More particularly, when the total moisture is adjusted to approximately 25% and the tapioca starch heated to about 95–100% C for approximately 16 hours, the resulting modified tapioca starch has optimum characteristics for use in a baby food formulation have a pH of up to 4.5.

In an alternative modification that has also been found to be advantageous, the naturally occurring tapioca starch has been placed in a steam atmosphere and allowed to pick up moisture while being heated. In such an atmosphere having a 100% relative humidity, the tapioca starch ultimately attains a moisture content of about 26% — its equilibrium moisture content. In addition, the use of microwave energy for heating the moisture-adjusted starch has been utilized. By employing varying conditions, different levels of restriction of the starch can be obtained. In this manner, the physically modified tapioca starch may also have uses outside the baby food area.

In a further embodiment of this invention, it has been found that other starches can be substituted for a minor proportion of the tapioca starch, either before or subsequent to physical modification, with a further enhancement in starch properties. Thus, 10–25% by weight or even more of the tapioca starch can be replaced by other non-modified starches such as wheat starch, corn starch, rice starch, rice flour, waxy rice starch, waxy maize starch and the like.

Although applicants do not desire to be limited in any particular theoretical concept, it appears that the mechanism by which the tapioca starch is altered through heat and limited moisture enhances the associative forces within the granule. As the tapioca starch granule is internally strengthened, through its own bonding mechanism, it resembles the external bonding that can be obtained through chemical modification. Although the temperatures employed to accomplish the modification described herein, substantially exceed the gelatinization temperature of tapioca starch, gelatinization does not occur as the water present is insufficient to produce swelling. The foregoing theory appears to be borne out by evaluation of heat-moisture treated starch wherein its acceptability compares with its chemically modified counterpart.

The wet, pre-cooked baby food formulation of this invention can be prepared by any of the methods well known to those skilled in this art. For example, the formulation can be prepared by forming a slurry, which is then heated to gelatinize the starch and "commercially sterilize" the ingredients to obtain the desired reduction in bacteria count. The amount of physically modified tapioca starch necessary to obtain a suitable consumer product is consistent with the prior art use of modified starches and is governed by the appearance desired, as well as other practical considerations such as the particular ingredients which are being combined. However, for purposes of illustration, physically modified starch in amounts of from as little as about 5 to about 55 pounds per 100 gallons of final formulation can be employed, with about 40–45 pounds of the physically modified tapioca starch per 100 gallons having been found to produce an especially attractive product. Various types of flour, such as potato, wheat and the like, are also employed as described in conventional quantities, such as about 5 to 20 pounds per 100 gallons of formulation. Salt and other seasonings may also be incorporated in conventional amounts for their obvious advantages.

To further illustrate the invention, the following examples are provided. It should be understood that the particular details of the examples are not to be regarded as limitations, as they may be varied as will be understood by one skilled in this art.

EXAMPLE I

The purpose of this example is to show the effect of heat-moisture on the gelatinization temperature of unmodified tapioca starch.

A. Unmodified tapioca starch (12.6% moisture) had added to it water to attain a sample containing 25% by total weight moisture. The sample was placed in an enclosed container and heated for 4 hours in an oven at 108° C. Upon completion of the heating period, the sample was removed from the container and allowed to air dry back to a moisture content of 13–14%. FIG. 1 of the drawing is an amylograph curve (7% dry basis in distilled water) demonstrating that the tapioca starch was restricted by the heat-moisture treatment. The resulting starch paste was found to be less cohesive, had an increased gelatinization temperature and was more resistant to breakdown. Similar tests were run over various lengths of time with unmodified tapioca starch having water in amounts of 16, 19, 22 and 28% total weight added thereto.

B. Unmodified tapioca starch was placed in an enclosed retort and steam allowed to enter the container for 8 hours. The starch was found to pick up moisture to its equilibrium level (approximately 26% by total weight) while being heated. It was found that the heat and moisture caused a restriction of the starch molecules similar to that present in Example IA. FIG. 2 of the drawing is an amylograph curve (7% dry basis in distilled water) demonstrating that the tapioca starch was restricted by the steam treatment.

EXAMPLE II

The physically modified tapioca starch of Example I was incorporated into a pack of strained bananas with pineapple prepared in the following proportions:

| Ingredient | Parts by Weight |
| --- | --- |
| Water | 57.0 |
| Banana Puree | 18.6 |
| Sugar | 11.5 |
| Crushed Pineapple | 6.9 |
| Tapioca Starch | 5.3 |
| Orange Concentrate | 0.4 |

Citric acid was added in an amount sufficient to adjust the pH to 4.4–4.5.

A corresponding amount of chemically modified tapioca* was incorporated into a similar pack of strained bananas with pineapple. The consistency (in Bostwick units) over a corresponding time period was recorded and the data set forth hereinafter in Table I.

*Modified in accordance with U.S. Pat. No. 2,500,950

Table I

| | Strained Bananas With Pineapple (Bostwick Units) | | | | |
| --- | --- | --- | --- | --- | --- |
| | Hot | 100° F. | 24 hrs | 8 wks at 70° F. | 8 wks at 40° F. |
| Heat/Moisture Treated | 13.0 | 5.0 | 3.0 | 2.7 | 1.2 (.2 ml free liquid) |
| Chemical Modification | 11.0 | 5.5 | 2.0 | 1.9 | .2 (1 ml free Liquid) |

EXAMPLE III

The following samples were each blended with 100 milliliters of water to bring the moisture content to approximately 26% by total weight:

A. 600 grams unmodified tapioca starch
B. 540 grams unmodified tapioca starch plus 60 grams unmodified rice flour.

The samples were placed in a 1 gallon container, the container sealed and placed in a steam atmosphere at 98° C for 16 hours. At the end of that time period, the samples were air dried to approximately 10% moisture by total weight, and along with a chemically cross-bonded tapioca starch* (control) were incorporated into corresponding jars of strained apricots in the following proportions and processed in the usual conventional manner for acid products:

*Modified in accordance with U.S. Pat. No. 2,500,950

| Ingredient | Parts by Weight |
| --- | --- |
| Apricot Puree | 47.0 |
| Sugar | 11.9 |
| Tapioca Starch | 5.3 |
| Water | 35.7 |

Citric acid was added in an amount sufficient to adjust the pH to 3.9–4.0.

The resulting products had the following characteristics:

Table II

| | | Consistency (Bostwick) | | | | | |
| --- | --- | --- | --- | --- | --- | --- | --- |
| | Hot (190°F) | (100°F) | 24 hr | 2 wk | 8 wk at 70°F | 8 wk at 40°F | mls. free liquid |
| Control | 7.25 | 3.5 | 2.8 | 1.6 | 1.1 | 0.8 | 1.0 |
| A | 7.5 | 6.5 | 4.7 | 1.6 | 0.8 | 0.5 | 1.0 |

Table II-continued

| | Consistency (Bostwick) | | | | | | |
|---|---|---|---|---|---|---|---|
| | Hot (190°F) | (100°F) | 24 hr | 2 wk | 8 wk at 70°F | 8 wk at 40°F | mls. free liquid |
| B | 6.75 | 5.5 | 4.5 | 2.5 | 2.3 | 1.2 | 1.0 |

From this data it is apparent that the heat/moisture treated tapioca starch of this invention exhibits similar consistency characteristics to that of chemically cross-bonded tapioca. Furthermore, the date indicates that the physically modified tapioca/rice combination sets up at a lesser rate than the other two samples. The combination of tapioca with other starches and/or flours is intended to extend the pH range and provide additional cold stability. FIG. 3 of the drawing is an amylograph curve (7% dry basis in distilled water) demonstrating the restriction of starch treated in accordance with the foregoing.

What is claimed is:

1. A process for preparing a thickened, wet, ready-to-eat baby food from an aqueous formulation having a pH of up to 4.5, consisting essentially of the steps of: incorporating into said aqueous formulation from about 5 to 55 pounds per 100 gallons of final formulation of an ungelatinized tapioca starch modified by adjusting the moisture content thereof to about 15–35% by total weight, heating said moisture adjusted starch to a temperature of about 70°–130° C, and maintaining said temperature for about from 1 to 72 hours; filling and sealing containers with said aqueous formulation; and heating said starch-containing aqueous formulation for a period of time sufficient to commercially sterilize the formulation.

2. A process in accordance with claim 1 wherein the moisture content is adjusted to approximately 25% by total weight.

3. A process in accordance with claim 1 wherein the temperature is adjusted to about 95°–100° C for approximately 16 hours.

4. A process in accordance with claim 1 wherein the heating and moisture adjustment is accomplished by steam injection.

5. A process in accordance with claim 1 and further characterized by replacing 10–25% by weight of the tapioca starch with non-modified grain starch prior to said modification.

6. A process in accordance with claim 5 wherein said grain starch is rice starch.

7. In a process for preparing a stabilized, thickened, wet, ready-to-eat formulation especially suitable for infant feeding, the improvement comprising incorporating therein an ungelatinized tapioca starch, modified solely by adjusting the moisture content thereof to about 15–35% by total weight and heating the moisture adjusted starch to a temperature of 70°–130° C for 1 to 72 hours.

8. A process in accordance with claim 5 wherein the moisture content is adjusted to approximately 25% by total weight.

9. A process in accordance with claim 5 wherein the temperature is adjusted to about 95°–100° C for approximately 16 hours.

10. A process in accordance with claim 5 wherein the heating and moisture adjustment is accomplished by steam injection.

11. A product made in accordance with the process of claim 1.

* * * * *